Patented Aug. 24, 1948

2,447,514

UNITED STATES PATENT OFFICE 2,447,514

METHOD OF DISSOLVING CELLULOSE IN AMMONIACAL COPPER COMPOUNDS

Theodor Lieser, Halle-on-the-Saale, Germany, assignor to American Bemberg Corporation, New York, N. Y., a corporation of Delaware No Drawing. Application December 12, 1940, Serial No. 369,905. In Germany November 13, 1939

4 Claims. (Cl. 106—167)

1

This invention relates to a method of dissolving cellulose in ammoniacal copper oxide. The method of dissolving cellulose in ammoniacal copper oxide owing to the high cost of the required agents, i. e., copper and ammonia, is one of the most expensive methods of producing cellulose solutions. Therefore, it is very important that the solvents are recovered. Moreover, it is generally desirable, with a view to increasing the economy of the cuprammonium rayon process, to reduce the consumption of copper and ammonia, i. e., to produce a satisfactory cellulose spinning solution of maximum cellulose content, but minimum $NH_3$— and copper content. In fact, this has been aimed at in the practice of the cuprammonium rayon process for years. Of course, progress in this direction is apparently limited on account of the highly polymerized nature of the cellulose. For example, a spinning solution containing 7 to 9 percent cellulose, 7 to 10 percent ammonia and 3 to 4 percent copper constitutes the optimum so far reached, while a proportion of 1 part of cellulose, 1 part of $NH_3$ and 0.45 part of copper is customary.

It is an important object of the instant invention to provide a method permitting the saving of ammonia.

Another object of the invention is to permit the saving of copper and to facilitate the recovery of the copper from the ammoniacal waste water.

Still another object of the invention is to provide a favorable dissolving method for the cellulose, preserving the structure of the cellulose.

Still another object is to produce a copper cellulose which can be readily coagulated.

I have now found that cellulose at low temperature is capable of combining with ammoniacal copper oxide the $NH_3$ content of which is lower than the minimum amount required at normal temperature, forming an addition compound which is soluble in said less concentrated ammoniacal copper oxide. Numerous experiments, some of which will be hereinafter described, have shown that the minimum $NH_3$ content required for attaining complete solution of the cellulose becomes lower and lower as the temperature is reduced, the limit being only given by the fact that the aqueous agent tends to freeze more readily with reduced $NH_3$ content. Nevertheless, my novel method, involving the cooling of the agents to low temperature, permits the dissolving of the cellulose by means of an ammoniacal copper oxide the ammonia content of which is much less than in the methods so far used. Of course, cellulose already has been dissolved at moderate

2 temperature and ice admixtures have been used, too. For example, German Patent No. 260,650 describes a method in which ice is added to concentrated ammonia for the reason that the solubility of copper hydroxide in ammonia is enhanced with decreasing temperature. However, even in that case 500 kgs. of ice are admixed to 400 liters of ammonia of 25 percent strength, resulting in an ammonia solution of about 11 percent strength. My novel method on the other hand permits the production of spinning solutions containing 8 percent cellulose and even more, while their $NH_3$ content is less than 6 percent.

More recent investigations regarding the nature of solutions of cellulose in ammoniacal copper oxide have shown that such solutions are based on addition compounds. Now, it is known that the formation and decomposition of addition compounds depends essentially also on the temperature, low temperature helping in their formation while high temperatures promote their decomposition. This general rule, applied to the process of dissolving cellulose in ammoniacal copper oxide, probably accounts for the fact that the addition compound cellulose-copper oxide-ammonia is formed more readily at low temperature than at a higher temperature. It will be noted that the formation of the chemical compound always is the condition for solubility of the cellulose, since purely physical cellulose solutions are not known to exist. It will be recognized, therefore, that the formation of the addition compound of cellulose and copper oxide-ammonia is the condition for the solubility of cellulose in ammoniacal copper oxide. The practicableness of my above described "low temperature cooling method" is greatly due to the fact that the addition compound cellulose-copper oxide-ammonia, while being formed at a low temperature, has no immediate tendency of decomposing as the temperature rises after its formation.

It may be observed that the results described herein furnish a very satisfactory verification of my above mentioner theory. It is to be understood, however, that I do not desire the claims to be limited thereby inasmuch as the theory has been presented in detail merely to make clear the nature of the invention.

In carrying out my novel method of dissolving cellulose in ammoniacal copper oxide, ammonia having a strength of less than 6, but at least 3 percent $NH_3$ is used for the solution, the cellulose being dissolved by cooling the ammoniacal copper oxide to a temperature below 0° C. By way of alternative, copper salts, for example, sulphate and oxychloride, may be used instead of copper hydroxide, adding the corresponding amount of alkali lye and proceeding for the rest as described above. Advantageously the cellulose is dissolved by means of ammonia the strength of which is selected so that the $NH_3$ content of the cellulose solution is less than 6 but not less than 3 percent by weight, while the cellulose content, for example, is from 6 to 12 percent.

A special advantage of my novel method resides in the low demand for copper, which is due to the fact that in a compound of cellulose and ammoniacal copper solution capable of solution the copper content is reduced in proportion to the reduced $NH_3$ content.

The advantages of my novel method over the known methods of dissolving ammoniacal copper oxide may be specified as follows:

1. Up to 50 percent of the amount of ammonia normally required may be saved.
2. A considerable proportion, for instance, 17 percent of the copper normally required may be saved.
3. The recovery of the copper from the ammoniacal waste waters is facilitated.
4. Owing to the lower $NH_3$ content, the lower temperature and the reduced introduction of ammonia and copper into the cellulose, and the consequent reduction of the inter- and intramicellular swelling of the cellulose, the same is preserved in the dissolving process, more particularly where pulp of wood or the like is used.
5. The coagulation of the copper cellulose is facilitated and in some instances already takes place under action of cold water.

*Example 1*

50 kgs. dry cotton linters are stirred with 600 liters ammonia of 5 percent strength and 21 kgs. of copper in the form of copper hydroxide, starting at room temperature which after a certain period of time is gradually reduced to −8° C. During the cooling, a completely homogeneous solution is being formed.

*Example 2*

50 kgs. dry pulp of wood or the like containing 96 percent alpha cellulose are stirred with 500 liters ammonia of 4 percent strength and 17 kgs. copper in the form of copper hydroxide at room temperature and for a period of some hours, followed by some hours stirring at a lower temperature, down to −7° C., whereupon a completely homogeneous solution is obtained.

*Example 3*

50 kgs. of dry pulp of wood or the like containing 98 percent alpha cellulose are subjected to agitation together with 29 kgs. copper oxychloride containing 59.5 percent copper, 550 liters ammonia of 4.3 percent strength and 45 liters soda lye of a specific density of $d=1.12$, at first at room temperature, for a period of 1 hour, and then at 0° C. for some hours, and finally at −8° C., also for some hours, whereupon a perfectly clear solution is obtained.

*Example 4*

100 kgs. of air dry pulp of wood or the like containing 96 percent alpha cellulose are admixed with 60 kgs. copper oxychloride, containing 54.8 percent copper, 560 liters ammonia of 8 percent strength and 96 liters soda lye of 12.4 percent strength. By cooling to low temperature, a concentrated solution is obtained after a short time, which is composed of 11.7 percent cellulose, 4.1 percent copper and 5.6 percent $NH_3$. Now the highly concentrated cellulose solution by addition of water may be diluted to the desired cellulose content. Any desired admixtures may be added to the diluting water.

The above proportions are by weight, except where stated otherwise.

The method of the present invention has been described in detail with reference to specific embodiments. It is to be understood, however, that the invention is not limited by such specific reference but is broader in scope and capable of other embodiments than those specifically described.

I claim:

1. A method of dissolving cellulose which comprises treating a cellulose with a solution of ammoniacal copper compounds at normal room temperature and then gradually cooling said solution to a temperature of about −7 to −8° C. to completely dissolve said cellulose therein, said solution comprising a copper compound selected from the group consisting of copper hydroxide, copper sulphate and copper oxychloride dissolved in water containing about 3 to 5.6 per cent by weight of ammonia.

2. A method of dissolving cellulose which comprises treating a cellulose with a solution of ammoniacal copper compounds at normal room temperature and then gradually cooling said solution to a temperature of about −7 to −8° C. to completely dissolve said cellulose therein, said solution comprising copper hydroxide dissolved in water containing about 3 to 5.6 per cent by weight of ammonia.

3. A method of dissolving cellulose which comprises treating a cellulose with a solution of ammoniacal copper compounds at normal room temperature and then gradually cooling said solution to a temperature of about −7 to −8° C. to completely dissolve said cellulose therein, said solution comprising copper sulphate dissolved in water containing about 3 to 5.6 per cent by weight of ammonia.

4. A method of dissolving cellulose which comprises treating a cellulose with a solution of ammoniacal copper compounds at normal room temperature and then gradually cooling said solution to a temperature of about −7 to −8° C. to completely dissolve said cellulose therein, said solution comprising copper oxychloride dissolved in water containing about 3 to 5.6 per cent by weight of ammonia.

THEODOR LIESER.

REFERENCES CITED

The following references are of record in the file of this patent:

UNITED STATES PATENTS

| Number | Name | Date |
|---|---|---|
| 658,632 | Fremery et al. | Sept. 25, 1900 |
| 672,350 | Bronnert et al. | Apr. 16, 1901 |
| 2,225,431 | Furness | Dec. 17, 1940 |
| 2,296,578 | Schlosser et al. | Sept. 22, 1942 |

FOREIGN PATENTS

| Number | Country | Date |
|---|---|---|
| 506,365 | Great Britain | May 25, 1939 |